G. BEEKMAN.
Cutting Apparatus for Mowers and Reapers.

No. 227,950. Patented May 25, 1880.

Witnesses:
C. Wyllys Betts
J. Hindon Hyde

Inventor:
Gerard Beekman

G. BEEKMAN.
Cutting Apparatus for Mowers and Reapers.
No. 227,950. Patented May 25, 1880.
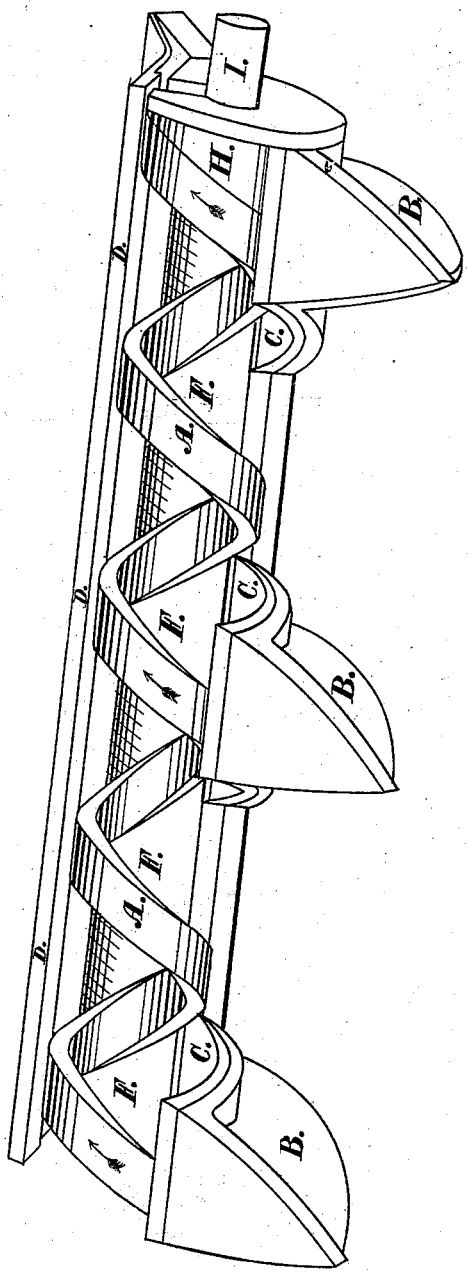

UNITED STATES PATENT OFFICE.

GERARD BEEKMAN, OF NEW YORK, N. Y., ASSIGNOR OF ONE-HALF OF HIS RIGHT TO JAMES WILLIAM BEEKMAN, OF SAME PLACE.

CUTTING APPARATUS FOR MOWERS AND REAPERS.

SPECIFICATION forming part of Letters Patent No. 227,950, dated May 25, 1880.

Application filed June 2, 1879.

*To all whom it may concern:*

Be it known that I, GERARD BEEKMAN, of the city, county, and State of New York, have invented a new and useful Improvement in Devices for Cutting Grain, Hay, and other substances, of which the following is a specification.

My invention relates to that class of cutting apparatus in which a revolving spiral cutter is used. Previous to my invention spiral cutters had been proposed, which failed to come into use from causes which it is the object of this invention to remedy. The main difficulties connected with such cutters are the necessity of frequently sharpening the cutting apparatus and the liability to gum up from the gummy matter exuding from the cut grass or grain, which soon so chokes up the old style of spiral cutters as to render them inoperative. To overcome these difficulties I have arranged my spiral cutter so that it will not only be self-sharpening, but it will tend to clear itself of the gummy matter before referred to. To accomplish this I use in connection with my cutter a bearing-plate, which rests directly upon the cutter, and is adjusted by set-screws, so that the cutter will always rest upon the teeth, and by its rotation keep both the edges of the cutter and the teeth always sharp and free from gum. The use of this bearing-plate also allows of dispensing with one of the usual journals of the spiral cutter, and in this manner the hollow in the center of the cutter can be made much larger, and any material that may collect in the cutter is much more readily passed out through its free end.

By dispensing with the outer bearing the cutter can operate at its extreme outer end, as the last tooth (or the divider, if there be one) may have a cutting-edge; whereas, if there is a bearing beyond the last tooth, as is necessary where there is a journal at each end of the cutter, the bearing of the journal is apt to choke up with grass and the gummy matter before referred to, and that portion of the grass over which passes the extreme end of the cutter, or that portion of it between the outer finger and the bearing, is liable to remain uncut and to be pressed down by the finger-bar as it passes over it.

Figure 1:
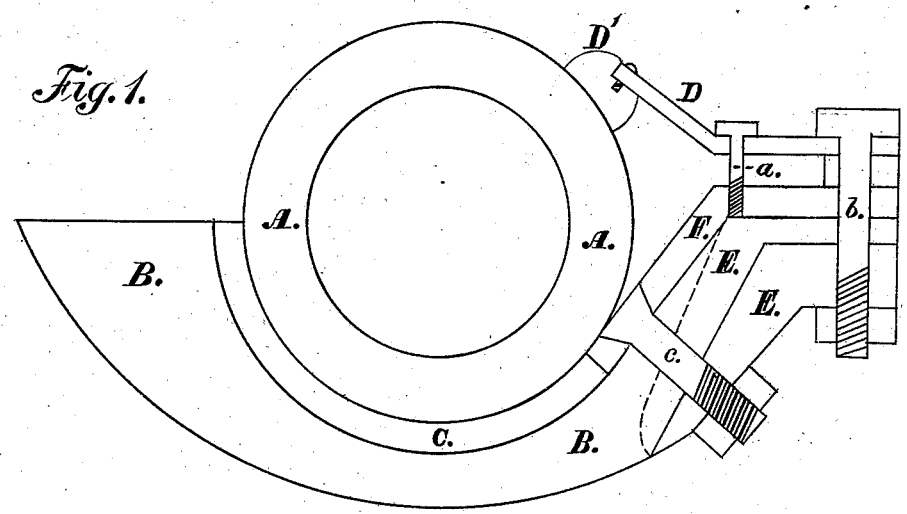
Figure 2:
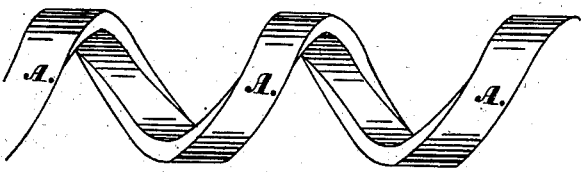
Figure 3:
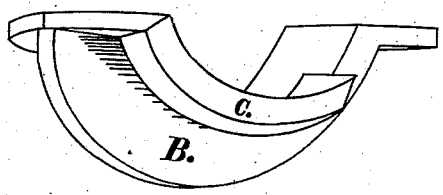
Figure 4:
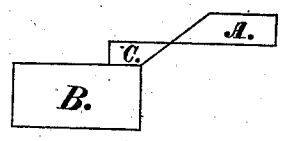

In the accompanying drawings, Figure 1 represents a full-size end view of the spiral cutter in connection with the bed upon which it rests and the top presser-plate in a vertical section. Fig. 2 represents a view of a part of the spiral cutter reduced. Fig. 3 represents a view of a modified and improved form of one of the teeth of the bed-plate. Fig. 4 represents a longitudinal sectional view of the lower part of one of the coils of the spiral cutter and of the beveled edge of one of the teeth at their point of contact with each other. Fig. 5 represents a perspective view of a portion of the arm of a mowing and reaping machine on a reduced scale. The view is from above and in front of the arm.

In all the drawings the same part is indicated by the same letter, and repeated letters in a drawing indicate like parts.

A, Figs. 1, 2, 4, and 5, is the spiral cutter. B, Figs. 1, 3, 4, and 5, is one of the teeth of the bed-plate. C, Figs. 1, 3, 4, and 5, is one of the plates upon which the spiral rests and against the edge of which it cuts. These plates are made of steel or chilled iron, and are bolted upon the curved portion of the teeth B, made to receive them; or the parts B and C may be made in one piece.

When the spiral cutter is used in the arm of a mowing and reaping machine the teeth B are made long enough to project out and beyond the plates C, so as to act as guards to prevent stones and sticks from entering the spiral.

In Figs. 3 and 4 the plate C is made much narrower than the tooth to which it is bolted, and projects over its side, and has a beveled edge to facilitate the shearing action. It is made narrower to decrease the amount of bearing-surface, and therefore the amount of friction. The friction of the spiral A sliding on the plate C tends to keep the two beveled edges sharp.

To keep the cutter in proper position and in contact with the teeth or the plates thereon, I employ a presser-plate, D, which may be made in one piece, as shown in Fig. 5, or it may have a removable wearing-piece, D', as shown in Fig. 1. This plate is secured in position by the screws *a b*, (not shown in Fig. 5,) and the pressure of the plate can be adjusted upon the cutter by the set-screw $a$, so as to always keep the cutter in the proper position upon the teeth B or the ledger-plates C, as the case may be, to produce the best effects both in cutting and in keeping the cutter sharp and free from gum.

E E, Fig. 1, is a plate, upon and into which the teeth are fastened by the bolts $b$ and $c$, each tooth being made separately and fitted into recessed chambers in the back plate. The bolts $b$ and $c$, Fig. 1, also fasten another plate upon the top of the rear portion of the teeth B, so as to cover that part when they are in position. F, Figs. 1 and 5, is this covering-plate.

H, Fig. 5, represents the drum or other mechanism to which the spiral is attached for the purpose of revolution.

I is the shaft to which the power is applied.

When the spiral is used in the arm of a mower and reaper the power should be applied by cogs or other suitable mechanism connecting the cutting apparatus with the wheels upon which the reaper moves.

When the spiral is used as a stationary cutter for any purpose the power may be applied to the shaft I by belting.

The spiral should be left open at the end toward which it cuts in order that any matter entering the hollow core of the spiral may be expelled at that end by the action of the spiral, and thus the cutter may be kept continually clean.

Fig. 5 shows the action of the entire mechanism. As the spiral revolves in the direction indicated by the arrows the back part of the spiral continually travels downward and forward along the edge of the plates C until it reaches the extreme forward point of these plates, and in this manner a shearing action is produced. The spiral should be made of steel, either twisted or cast, and strong enough to prevent breaking.

What I claim is—

1. The cutting apparatus herein described, consisting of the spiral cutter A, provided with a journal at one end only, in combination with suitable guides operating directly on the spiral cutter to keep it in position for work, substantially as and for the purpose specified.

2. The combination of the spiral cutter A and the teeth B with the presser-plate D, pressing directly upon the cutter, substantially as and for the purpose specified.

GERARD BEEKMAN.

Witnesses:
C. WYLLYS BETTS,
J. E. HINDON HYDE.